US009426477B2

(12) United States Patent
Lu et al.

(10) Patent No.: US 9,426,477 B2
(45) Date of Patent: Aug. 23, 2016

(54) METHOD AND APPARATUS FOR ENCODING SURVEILLANCE VIDEO

(75) Inventors: Ligang Lu, New York, NY (US); Peter Westerink, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 610 days.

(21) Appl. No.: 12/712,717

(22) Filed: Feb. 25, 2010

(65) Prior Publication Data
US 2011/0206122 A1    Aug. 25, 2011

(51) Int. Cl.
H04N 7/32         (2006.01)
H04N 19/137       (2014.01)
H04N 19/172       (2014.01)
H04N 19/107       (2014.01)
H04N 19/14        (2014.01)

(52) U.S. Cl.
CPC ........... *H04N 19/137* (2014.11); *H04N 19/107* (2014.11); *H04N 19/14* (2014.11); *H04N 19/172* (2014.11)

(58) Field of Classification Search
None
See application file for complete search history.

(56) References Cited

U.S. PATENT DOCUMENTS

| 2003/0107648 | A1  | 6/2003  | Stewart et al. |
| 2005/0254692 | A1* | 11/2005 | Caldwell ........................ 382/120 |
| 2005/0271251 | A1  | 12/2005 | Russell et al. |
| 2006/0078051 | A1* | 4/2006  | Liang et al. ............... 375/240.24 |
| 2007/0247549 | A1  | 10/2007 | Jeong et al. |
| 2008/0218590 | A1* | 9/2008  | Park et al. ...................... 348/143 |
| 2008/0232468 | A1  | 9/2008  | Kwon et al. |
| 2009/0080519 | A1  | 3/2009  | Jeong et al. |
| 2009/0109298 | A1* | 4/2009  | Wan ............................ 348/222.1 |
| 2009/0122860 | A1  | 5/2009  | Yin et al. |
| 2009/0154816 | A1  | 6/2009  | Swazey et al. |
| 2009/0323809 | A1* | 12/2009 | Raveendran ............. 375/240.16 |

FOREIGN PATENT DOCUMENTS

| JP | 2000261809 | 9/2000 |
| JP | 2004266720 | 9/2004 |
| JP | 2006094081 | 4/2006 |
| JP | 2009182623 | 8/2009 |

OTHER PUBLICATIONS

Ding et al., Adaptive group-of-pictures and scene change detection methods based on existing H.264 advanced video coding information, EIT Image Process, vol. 2, No. 2, pp. 85-94 (2008).
Ding et al., "Motion-based Adaptive GOP Algorithms for Efficient H.264/AVC Compression," Institute of Computer and Communication Engineering, Oct. 2006.
Babu et al., "Object-based Surveillance Video Compression using Foreground Motion Compensation," IEEE, pp. 17-52, ICARCV (2006).

* cited by examiner

*Primary Examiner* — Kate Luo
(74) *Attorney, Agent, or Firm* — Ryan, Mason & Lewis, LLP

(57) ABSTRACT

Methods and apparatus are provided for encoding video, such as surveillance video. A video frame is encoded by evaluating a level of activity in video frame relative to one or more neighboring frames; encoding the video frame using an inter-coding technique if the evaluation satisfies one or more predefined inter-coding criteria, wherein said inter-coding technique is applied to said video frame without a Group of Picture structure having a maximum number of consecutive inter-coded frames; and encoding the video frame using an intra-coding technique if the evaluation satisfies one or more predefined intra-coding criteria. The evaluating step may comprise, for example, determining whether differences between the video frame and the one or more neighboring frames exceed a predefined threshold.

20 Claims, 4 Drawing Sheets

METHOD AND APPARATUS FOR ENCODING SURVEILLANCE VIDEO

FIELD OF THE INVENTION

The present invention relates generally to video coding techniques, and more particularly, to video coding techniques for low activity applications, such as surveillance applications.

BACKGROUND OF THE INVENTION

Video surveillance cameras are increasingly used in many applications, such as security and traffic monitoring. In most applications, analog cameras are typically employed. Analog cameras produce uncompressed video images. Digital cameras, on the other hand, generate compressed signals that use, for example, a Motion JPEG (M-JPEG) or H.264 coding standard. With the Motion JPEG coding standard, for example, each video frame or interlaced field of a digital video sequence is separately compressed as a JPEG image.

Surveillance applications typically must store the captured video images. Due to the large number of video images to be stored, the storage cost becomes an important consideration. Thus, an efficient video compression scheme is an important component of any video storage system. With the Motion JPEG coding standard, each image is coded independently of other images, using a technique referred to as intra-frame coding. With intra-frame coding, compression techniques are performed relative to the information contained only within the current frame (and not relative to any other frame in the video sequence). Intra-frame coding provides easy post-processing, such as editing of the images, because any image in the video scene may be directly accessed. Intra-frame coding, however, uses more bits than predictive coding or inter-coding.

With inter-frame coding, such as MPEG coding, a video compression stream is expressed in terms of one or more neighboring frames. Inter-frame prediction leverages temporal redundancy between neighboring frames and thereby provides higher compression rates. Existing video coding techniques, such as MPEG and H.264, were developed primarily for broadcasting and DVD applications and employ well-known Group of Picture (GOP) techniques.

GOP techniques specify a maximum number of frames between each intra-frame, such as every 15 frames. The intra-coded frames provide the required entry points for prompt channel changes in broadcasting applications and fast forward and backward searching in DVD applications. The maximum number of frames between each intra-frame requires existing video coding techniques to periodically encode an intra-coded frame, without regard to whether the level of activity in the monitored scenes even requires an intra-frame. Thus, even with inter-frame coding, the high temporal correlation in the consecutive pictures is not fully exploited, resulting in lower compression performance.

In many applications, however, including surveillance applications, the monitored scenes often have little activity. A need therefore exists for improved techniques for coding and compression of surveillance video, and video from low activity applications that do not necessarily require fast editing and channel switching. A further need exists for improved techniques for video coding that do not require fixed or adaptive GOP structures having a maximum number of consecutive inter-coded frames.

SUMMARY OF THE INVENTION

Generally, methods and apparatus are provided for encoding video, such as surveillance video. According to one aspect of the invention, a method is provided for encoding a video frame by evaluating a level of activity in video frame relative to one or more neighboring frames; encoding the video frame using an inter-coding technique if the evaluation satisfies one or more predefined inter-coding criteria, wherein said inter-coding technique is applied to said video frame without a Group of Picture constraint; and encoding the video frame using an intra-coding technique if the evaluation satisfies one or more predefined intra-coding criteria.

The evaluating step may comprise, for example, determining whether differences between the video frame and the one or more neighboring frames exceed a predefined threshold. In one implementation, the evaluating step evaluates activity in the video frame by summing pixel differences between two frames and comparing the sum to a predefined threshold. For example, the level of activity can be evaluated using one or more of difference thresholding, motion estimation and motion compensation. The predefined inter-coding and intra-coding criteria may comprise, for example, whether the differences satisfy a predefined criteria. As used herein, the term "difference thresholding" shall indicate the testing of whether a value calculated as a function over a set of difference values exceeds a certain threshold value or not.

If predictable activity in the video frame satisfies predefined criteria, the video frame can be encoded using an inter-coding technique with motion estimation. If predictable activity in the video frame does not satisfy predefined criteria, the video frame can be encoded using an intra-coding technique. Predictable activity in the video frame can be evaluated by summing pixel differences between a previous frame and a motion compensated input frame.

According to another aspect of the invention, a method is provided for encoding a video frame by evaluating a level of activity in video frame relative to one or more neighboring frames; encoding said video frame using an inter-coding technique if said evaluation satisfies one or more predefined inter-coding criteria; and encoding said video frame using an intra-coding technique only if said evaluated said level of activity exceeds a predefined threshold.

A more complete understanding of the present invention, as well as further features and advantages of the present invention, will be obtained by reference to the following detailed description and drawings.

DETAILED DESCRIPTION OF PREFERRED EMBODIMENTS

The present invention provides improved techniques for coding and compression of surveillance video, and video from other low activity applications that do not require frequent editing and/or fast channel switching. The present invention recognizes video sequences recorded during periods of low activity can be more efficiently compressed to significantly save the storage cost. The present invention provides a method and system for video coding for surveillance applications that can more efficiently exploit the temporal correlations than the prior art methods. The disclosed video coding techniques significantly reduce the encoder output bit rate and therefore the storage size.

Group of Picture Techniques

Figure 1:
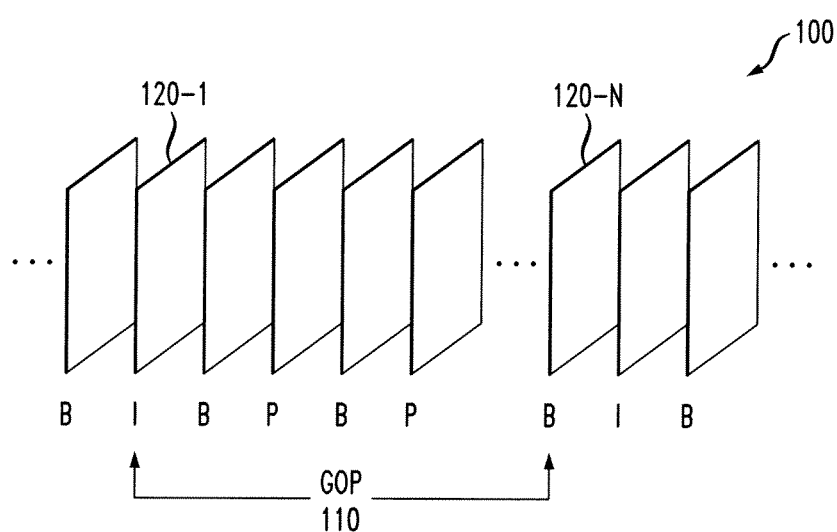
FIG. 1 illustrates a conventional M-JPEG technique for coding video, using well-known Group of Picture (GOP) techniques.

FIG. 1 illustrates a conventional M-JPEG technique for coding video, using well-known Group of Picture (GOP) techniques. As shown in FIG. 1, a GOP structure 110 specifies the order in which intra-frames and inter-frames are arranged. The GOP 110 is a group of successive images 120-1 through 120-N within a coded video stream 100. Each coded video stream 100 consists of successive GOPs 110. For a more detailed discussion of exemplary Group of Picture techniques, see, for example, "Information Technology—Generic Coding of Moving Pictures and Associated Audio Information," ISO/IEC 13818-2, incorporated by reference herein.

As shown in FIG. 1, the exemplary GOP 110 contains the following image types:

I—an I-image or I-frame (intra coded image)—a reference image that represents a coded video frame and that is independent of other image types. The I-frames contain a full image and do not require any additional information to reconstruct the image. Each GOP 110 begins with an I image.

P—a P-image or P-frame (predictive coded image)—an image that contains motion-compensated difference information from the preceding I- or P-frame.

B—a B-image or B-frame (bi-directionally predictive coded image)—an image that contains difference information from the preceding and following I- or P-frame within a GOP 110.

Generally, any errors within a GOP structure 110 will be prevented from propagating into the next GOP by the next I-frame. Also, increasing the number of I-frames in a video stream increases the ability to edit the stream and switch into this stream. Increasing the number of I-frames, however, increases the stream size. In order to save bandwidth and disk space, many applications only employ one I-frame per GOP 110.

As well as P-frames, B-frames need motion vectors and transform coefficients describing prediction correction in order to make the prediction. In order to avoid a big propagation error, B-frames are not used as a reference to make any kind of prediction.

Improved Coding of Low Activity Image Sequences

As previously indicated, in many applications, such as surveillance applications, there is often negligible activity for significant periods of time. For example, at night, the scene monitored by a surveillance application often remains static. The scene monitored by the surveillance camera can remain static and two frames that are separated by seconds and even minutes can be substantially identical. According to one aspect of the present invention, for time periods that have negligible activity, inter-frame coding is employed to compress the video source, whenever possible, rather than inserting intra-coded frames on a regular basis. In this manner, a large number of unnecessary intra-coded frames is avoided and the bandwidth and storage utilization is more efficient.

In one exemplary implementation, the invention comprises the following steps:

1. Before coding the next video frame (picture), determine if the frame contains significant differences from one or more neighboring reference (in-time) frames (it is noted that the neighboring reference frames need not be directly adjacent in-time); A reference frame is either an I frame or a P frame as described above.

2. If it is determined that there is no significant difference from the one or more neighboring reference frames, encode the current frame using inter-coding, optionally including encoding the frame using a skip mode if the encoding method provides for one;

3. Only if there is significant difference, encode the current frame as an intra-coded frame.

Figure 2:
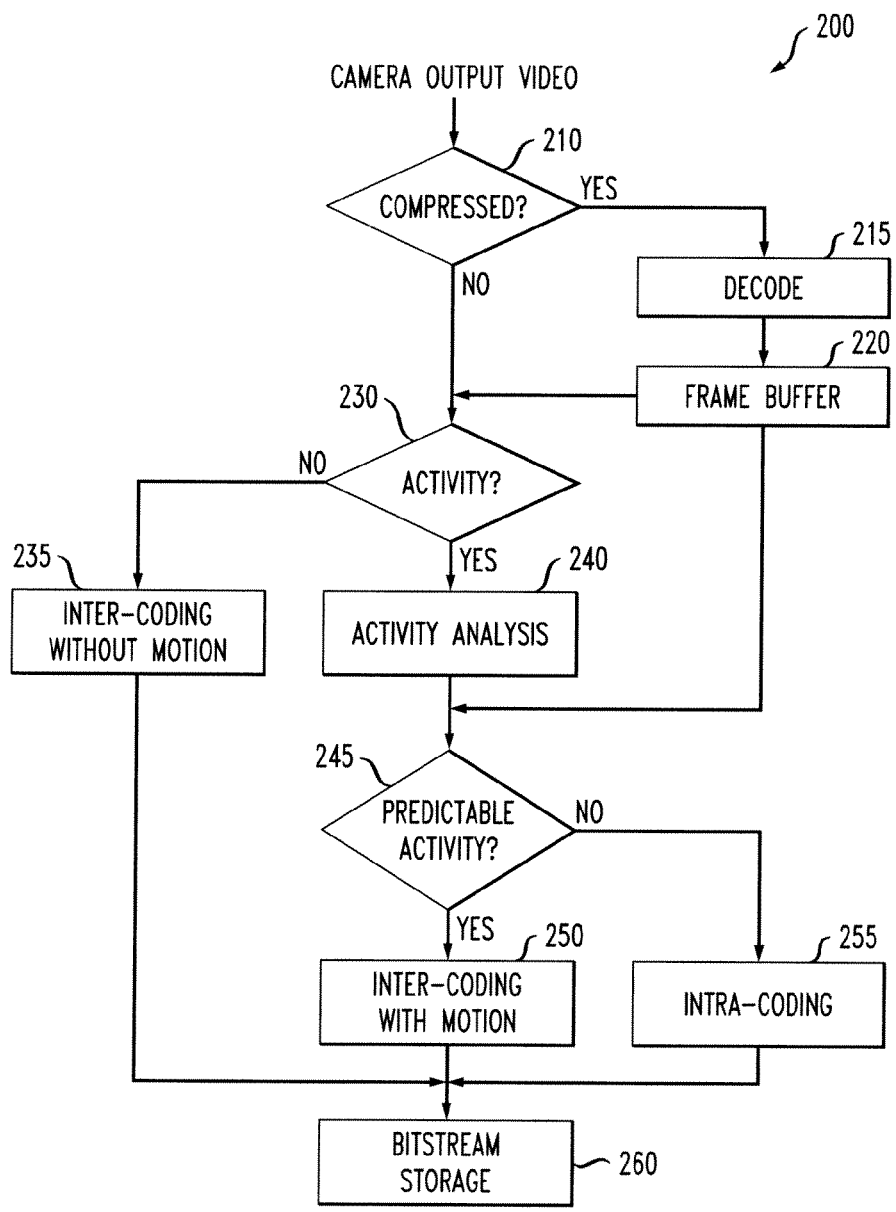
FIG. 2 is a flow chart describing an exemplary implementation of a coding process for coding low activity images in accordance with an embodiment of the present invention.

FIG. 2 is a flow chart describing an exemplary implementation of a coding process 200 for coding low activity images in accordance with an embodiment of the present invention. As shown in FIG. 2, the coding process 200 receives video images from a camera and initially performs a test during step 210 to determine if the received video is compressed. If it is determined during step 210 that the received video is compressed, then the received video is decoded during step 215 and stored in a frame buffer during step 220.

A test is performed during step 230 to determine if the activity in the frame exceeds a predefined threshold. In one exemplary implementation, motion estimation (ME) and motion compensated frame difference (MCFD) are employed during step 230 to determine whether the current frame is significantly different from the adjacent reference frame(s). The adjacent reference frames can be one or more previous frames; or one or more future frames; or one or more both previous and future frames; whichever minimizes the MCFD.

If it is determined during step 230 that the activity in the frame does not exceed a predefined threshold, then the received video is coded during step 235 using inter-coding without motion estimation and/or compensation and then program control proceeds to step 260, discussed below.

If however, it is determined during step 230 that the activity in the frame does exceed a predefined threshold, then an activity analysis is performed during step 240. A test is then performed during step 245 to determine if the activity in the frame is predictable. Predictability can be evaluated, for example, by running a motion estimation procedure, which typically produces a set of motion vectors used for motion compensation, as well as a measure of the remaining prediction error. Thus, the motion estimator can be used as a predictability evaluator. Prediction techniques include differences thresholding, as well as motion estimation and compensation.

If it is determined during step 245 that the activity in the frame is predictable, then the received video is coded during step 250 using inter-coding with motion estimation and prediction and then program control proceeds to step 260, discussed below. If, however, it is determined during step 245 that the activity in the frame is not predictable, then the received video is coded during step 255 using intra-coding before program control proceeds to step 260. The encoded bitstream is stored during step 260.

Figure 3:
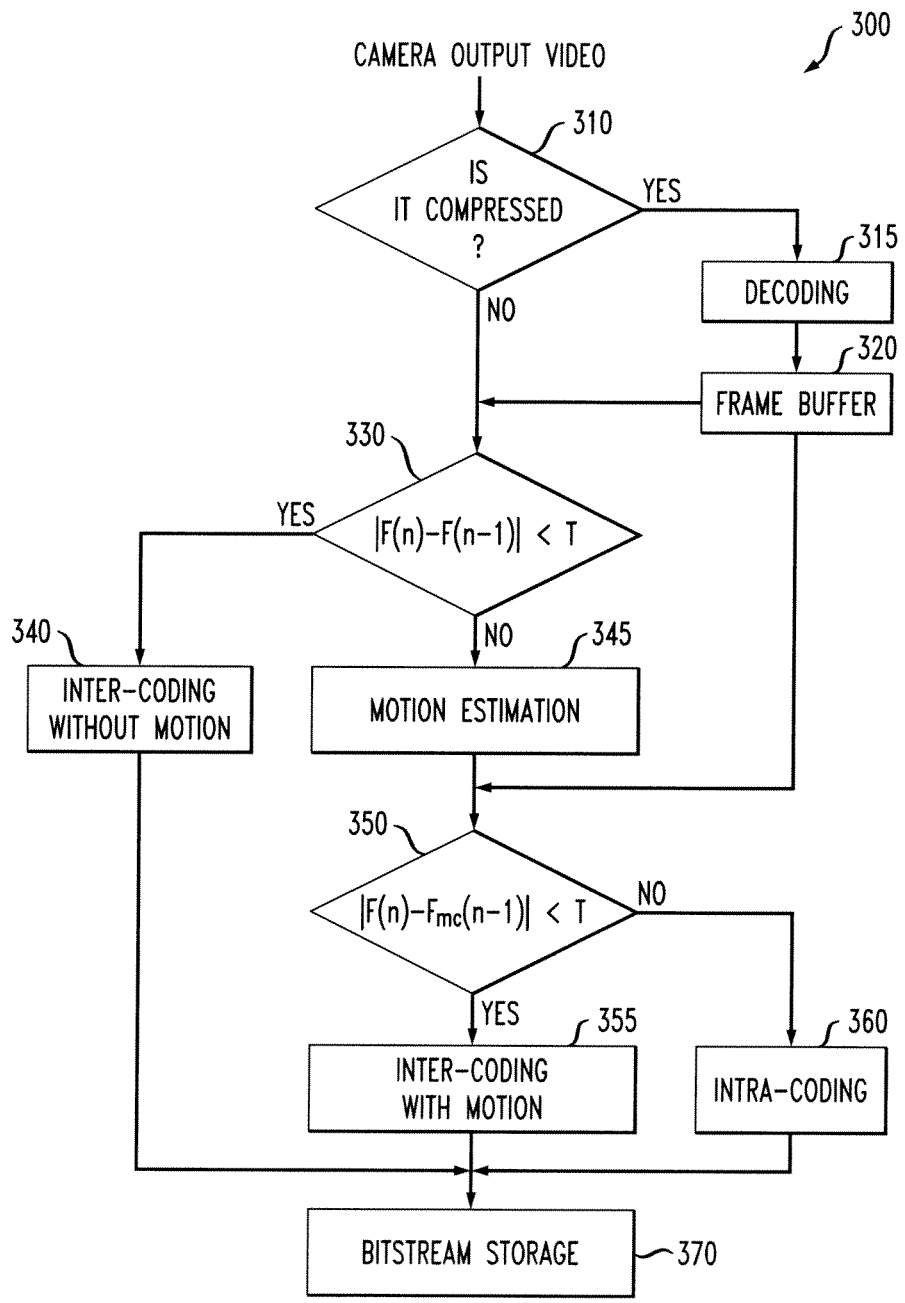
FIG. 3 is a flow chart describing an exemplary implementation of a coding process for coding low activity images in accordance with an alternate embodiment of the present invention.

FIG. 3 is a flow chart describing an exemplary implementation of a coding process 300 for coding low activity images in accordance with an alternate embodiment of the present invention. As shown in FIG. 3, the coding process 300 receives video images from a camera and initially performs a test during step 310 to determine if the received video is compressed. If it is determined during step 310 that the received video is compressed, then the received video is decoded during step 315 and stored in a frame buffer during step 320.

A test is performed during step 330 to evaluate the input frame activity by summing the pixel differences, F, between two frames (n) and (n−1) and comparing the sum to a threshold, T. If it is determined during step 330 that the frame activity does not exceed the threshold, then the received video is coded during step 340 using inter-coding without motion estimation and/or compensation and then program control proceeds to step 370, discussed below. If, however, it is determined during step 330 that the frame activity does exceed the threshold, then a motion estimation analysis is performed during step 345 to evaluate the activity in the frame.

A test is performed during step 350 to evaluate the predictability of the activity by summing the pixel differences between a previous frame and the motion compensated input frame. If this sum falls below a threshold, then the frame is deemed to be predictable, otherwise the frame is not deemed to be predictable.

If it is determined during step 350 that the activity in the frame is predictable, then the received video is coded during step 355 using inter-coding with motion estimation and prediction and then program control proceeds to step 370, discussed below. If, however, it is determined during step 350 that the activity in the frame is not predictable, then the received video is coded during step 360 using intra-coding before program control proceeds to step 370. The encoded bitstream is stored during step 370.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 4:
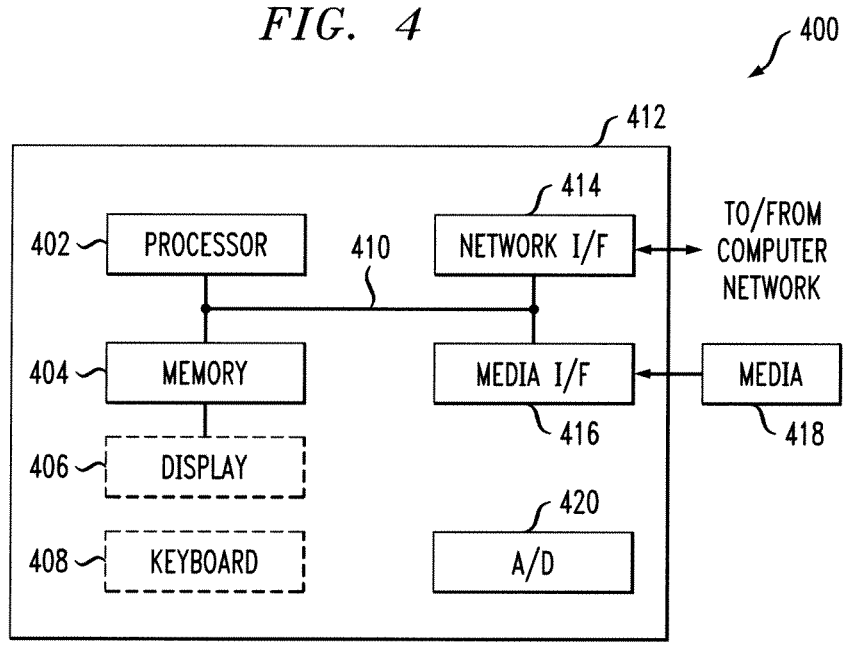
FIG. 4 depicts a computer system that can implement one or more aspects and/or elements of the present invention.

One or more embodiments can make use of software running on a general purpose computer or workstation. FIG. 4 depicts a computer system 400 that may be useful in implementing one or more aspects and/or elements of the present invention. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Analog-to-digital converter(s) 420 may be provided to receive analog input, such as analog video feed, and to digitize same. Such converter(s) may be interconnected with system bus 410.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 418 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Method steps described herein may be tied, for example, to a general purpose computer programmed to carry out such steps, or to hardware for carrying out such steps, as described herein. Further, method steps described herein, including, for example, obtaining data streams and encoding the streams, may also be tied to physical sensors, such as cameras or microphones, from whence the data streams are obtained.

It should be noted that any of the methods described herein can include an additional step of providing a system comprising distinct software modules embodied on a computer readable storage medium. The method steps can then be carried out using the distinct software modules and/or sub-modules of the system, as described above, executing on one or more hardware processors 402. In some cases, specialized hardware may be employed to implement one or more of the functions described here. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for encoding a plurality of video frames, comprising:
   evaluating, using at least one processing device, a level of activity in a given whole video frame relative to one or more neighboring frames in said plurality of video frames;
   if said level of activity does not satisfy one or more predefined activity criteria, encoding, using at least one processing device, said given whole video frame using an inter-coding technique without motion compensation, wherein said inter-coding technique without motion compensation is applied to said plurality of video frames without a maximum number of consecutive inter-coded frames;
   if said level of activity does satisfy said one or more predefined activity criteria, determining if predictable activity in one or more of said plurality of video frames satisfies one or more predefined predictability criteria;
   encoding said given video frame using an inter-coding technique with motion estimation if said one or more of said plurality of video frames satisfies said one or more predefined predictability criteria; and
   encoding, using at least one processing device, said given whole video frame using an intra-coding technique if said one or more of said plurality of video frames does not satisfy said one or more predefined predictability criteria.

2. The method of claim 1, wherein said evaluating step further comprises the step of determining whether differences between said whole video frame and said one or more neighboring frames exceed a predefined threshold.

3. The method of claim 1, wherein said step of evaluating a level of activity comprises one or more of difference thresholding, motion estimation and motion compensation.

4. The method of claim 1, further comprising the step of encoding said whole video frame using a skip mode.

5. The method of claim 1, wherein said evaluating step evaluates activity in said whole video frame by summing pixel differences between two frames and comparing said sum to a predefined threshold.

6. The method of claim 1, wherein said predictable activity is evaluated by summing pixel differences between a previous frame and a motion compensated input frame.

7. A computer program product, said computer program product comprising a non-transitory computer-readable recordable storage medium having computer readable program code embodied therewith, said computer readable program code comprising:
   computer readable program code configured to evaluate, using at least one processing device, a level of activity in a given whole video frame relative to one or more neighboring frames in said plurality of video frames;
   computer readable program code configured to encode, if said level of activity does not satisfy one or more predefined activity criteria, using at least one processing device, said given whole video frame using an inter-coding technique without motion compensation, wherein said inter-coding technique without motion compensation is applied to said plurality of video frames without a maximum number of consecutive inter-coded frames;
   computer readable program code configured to determine, if said level of activity does satisfy said one or more predefined activity criteria, if predictable activity in one or more of said plurality of video frames satisfies one or more predefined predictability criteria;
   computer readable program code configured to encode said given video frame using an inter-coding technique with motion estimation if said one or more of said plurality of video frames satisfies said one or more predefined predictability criteria; and
   computer readable program code configured to encode, using at least one processing device, said given whole video frame using an intra-coding technique if said one or more of said plurality of video frames does not satisfy said one or more predefined predictability criteria.

8. The computer program product of claim 7, wherein said evaluation further comprises determining whether differences between said whole video frame and said one or more neighboring frames exceed a predefined threshold.

9. The computer program product of claim 7, wherein said evaluation of a level of activity comprises one or more of difference thresholding, motion estimation and motion compensation.

10. The computer program product of claim 7, wherein said whole video frame comprises surveillance video.

11. The computer program product of claim 7, wherein said computer readable program code is further configured to encode said whole video frame using a skip mode.

12. The computer program product of claim 7, wherein said evaluation evaluates activity in said whole video frame by summing pixel differences between two frames and comparing said sum to a predefined threshold.

13. The computer program product of claim 7, wherein said predictable activity is evaluated by summing pixel differences between a previous frame and a motion compensated input frame.

14. The computer program product of claim 13, wherein said whole video frame comprises predictable activity if said sum falls below a threshold.

15. An apparatus, comprising:
   a memory; and
   at least one processor, coupled to the memory, operative to:
   evaluate, using at least one processing device, a level of activity in a given whole video frame relative to one or more neighboring frames in said plurality of video frames;
   if said level of activity does not satisfy one or more predefined activity criteria, encode, using at least one processing device, said given whole video frame using an inter-coding technique without motion compensation, wherein said inter-coding technique without motion compensation is applied to said plurality of video frames without a maximum number of consecutive inter-coded frames;
   if said level of activity does satisfy said one or more predefined activity criteria, determine if predictable activity in one or more of said plurality of video frames satisfies one or more predefined predictability criteria;
   encode said given video frame using an inter-coding technique with motion estimation if said one or more of said plurality of video frames satisfies said one or more predefined predictability criteria; and encode, using at least one processing device, said given whole video frame using an intra-coding technique if said one or more of said plurality of video frames does not satisfy said one or more predefined predictability criteria.

16. The apparatus of claim 15, wherein said evaluating further comprises the step of determining whether differences between said whole video frame and said one or more neighboring frames exceed a predefined threshold.

17. The apparatus of claim 15, wherein said evaluating a level of activity comprises one or more of difference thresholding, motion estimation and motion compensation.

18. The apparatus of claim 15, wherein said at least one processor is further configured to encode said whole video frame using a skip mode.

19. The apparatus of claim 15, wherein said evaluating evaluates activity in said whole video frame by summing pixel differences between two frames and comparing said sum to a predefined threshold.

20. The apparatus of claim 15, wherein said predictable activity is evaluated by summing pixel differences between a previous frame and a motion compensated input frame.

* * * * *